United States Patent [19]

Wohlford et al.

[11] Patent Number: 4,611,860

[45] Date of Patent: Sep. 16, 1986

[54] TRACK SECTION HAVING COOPERATING FLEXOR, LINK AND GROUSER DESIGN FOR REDUCING STRESS

[75] Inventors: William P. Wohlford, Bettendorf; Nicolae V. Orlandea, Davenport, both of Iowa

[73] Assignee: Deere & Company, Moline, Ill.

[21] Appl. No.: 753,492

[22] Filed: Jul. 10, 1985

[51] Int. Cl.$^4$ .................... B62D 55/24; B62D 55/28
[52] U.S. Cl. ........................ 305/43; 305/54; 305/57
[58] Field of Search .................. 305/40, 41, 43, 54, 305/57

[56] References Cited

U.S. PATENT DOCUMENTS

| | | | |
|---|---|---|---|
| 1,952,545 | 3/1934 | Gotshall | 305/39 |
| 3,250,576 | 5/1966 | Kroogov | 305/43 |
| 3,346,306 | 10/1967 | Siber | 305/41 |
| 3,758,171 | 9/1973 | Plastino | 305/40 |
| 4,428,625 | 1/1984 | Wohlford | 305/43 |
| 4,451,097 | 5/1984 | Wohlford | 305/40 |

Primary Examiner—David A. Scherbel
Assistant Examiner—Dennis C. Rodgers

[57] ABSTRACT

The respective ends of the link and grouser of a track link section are shaped so that an enlarged middle portion of a flexor extending between adjacent track link sections is embraced by the link and grouser ends in such a way that the radius of flexure of the flexor is controlled and such that no open volumes ever exist, between the flexor and link and grouser ends, which would allow debris to enter and alter the desired controlled radius of flexure.

1 Claim, 2 Drawing Figures

TRACK SECTION HAVING COOPERATING FLEXOR, LINK AND GROUSER DESIGN FOR REDUCING STRESS

BACKGROUND OF THE INVENTION

The present invention relates to drive tracks for track-laying vehicles and more particularly relates to track sections embodying flexors and designed to minimize stress in the tension-carrying elements of the flexor.

U.S. Pat. No. 4,451,097 issued to Wohlford on 29 May 1984 discloses a track section including a pair of rectangular flexors, each having one end sandwich between flat surfaces respectively of a link and grouser and having a second end adapted for being similarly sandwiched between the link and grouser of an adjacent track section whereby a plurality of sections may be interconnected to form an endless track. The link and grouser each have curved end surfaces adapted to control the radius of flexure of the flexors during operation, as when passing around the drive sprocket, for example. It has been found, however, that sand or other material finds its way to areas between the respective curved surfaces of the link and grouser and the flexor and results in the flexor bending sharper and thus being strained greater than is desirable.

SUMMARY OF THE INVENTION

According to the present invention there is provided an improved track section of a type embodying a flexor having an end clamped between flat surfaces respectively of a link and grouser.

An object of the invention is to provide a track section wherein the link, grouser and flexor are designed to cooperate such that the bend radius of the flexor is controlled so as not to exceed a predetermined maximum and such that sand and other material has no influence on the bend radius.

A more specific object of the invention is to provide a track section including a flexor comprising a tensile force transmitting element encased in an elastomeric material having a middle portion shaped to fill voids at the adjacent ends of link and grouser members of adjacent track sections and with the adjacent link ends overlapping so as to bear upon the middle portion of the elastomeric material in such a way as to control the radius of flexure of the flexor.

These and other objects, features and advantages of the present invention will become apparent to those skilled in the art from the description which follows and from the drawings.

DESCRIPTION OF THE PREFERRED EMBODIMENT

Figure 1:
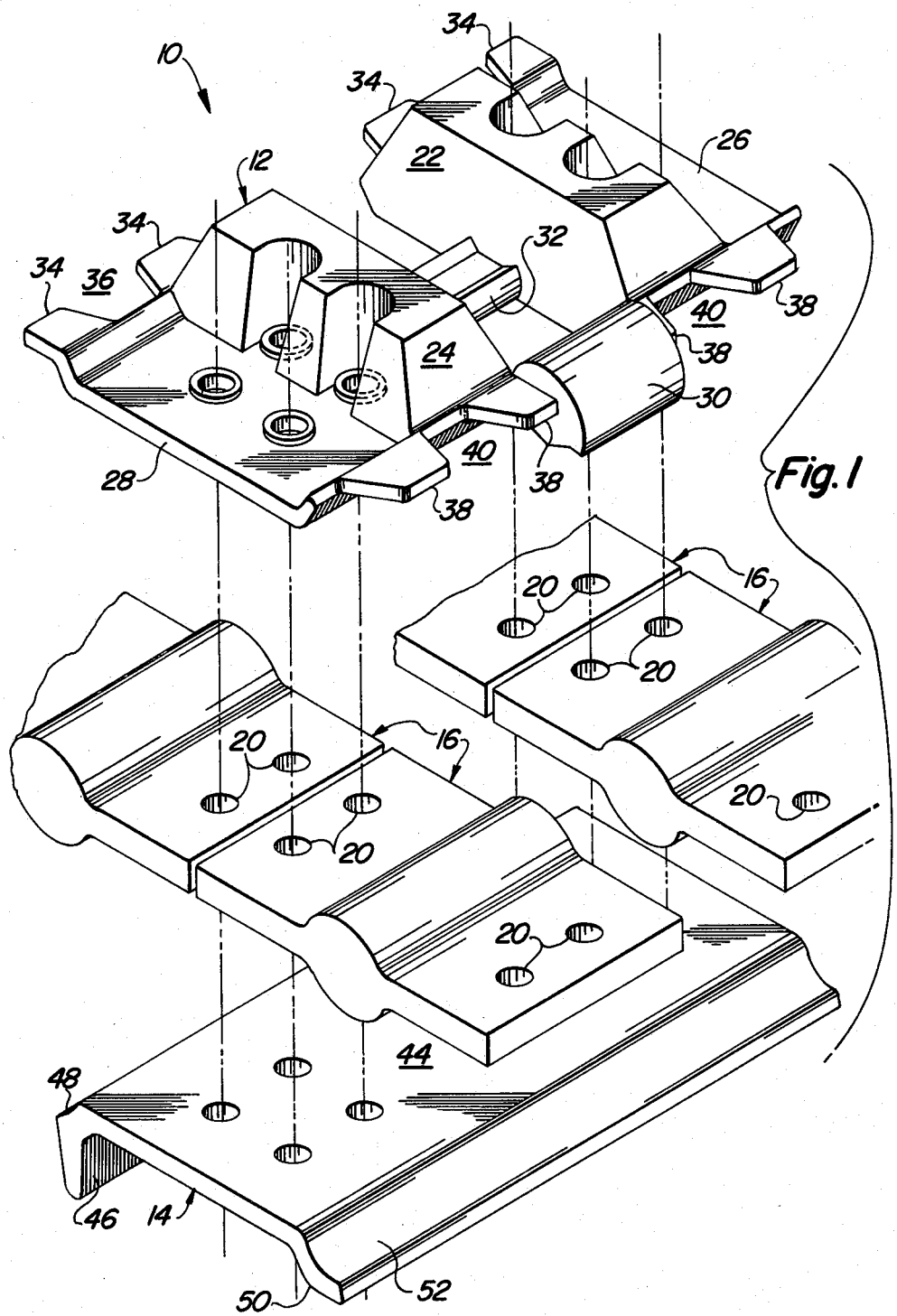
FIG. 1 is an exploded view of an endless track link section constructed in accordance with the present invention.

Referring now to the drawings, there is shown (FIG. 1) a link section 10 adapted for connection with a plurality of like link sections (FIG. 2) for forming an endless track for use on a track-laying tractor, for example. The link section 10 includes a link 12 and a grouser 14 secured in sandwiching relationship to first ends of a pair of laterally spaced flexors 16 by four bolts 18 (FIG. 1) which respectively pass through pairs of holes 20 provided in first ends of each of the flexors 16. Similar holes are provided in second ends of each flexor for receiving bolts for clamping the second end of each flexor between the link and grouser of an adjacent link section.

As viewed in FIG. 1, each link 12 includes right and left, upright rail portions 22 and 24, respectively, which are integral with flexor-engaging plate portions 26 and 28. As considered in the forward direction of travel (from right to left in the drawings), the trailing ends of the rail portions 22 and 24 are interconnected by a transverse sprocket-engaging member 30, and a further transverse member 32 joins the rail portions at a location intermediate their leading and trailing ends. The leading ends of the flexor-engaging plate portions 26 and 28 are defined by a plurality of tabs 34 spaced transversely from each other so as to leave spaces 36 therebetween. The trailing ends of the plate portions 26 and 28 are defined by a plurality of tabs 38 arranged in longitudinal alignment with the spaces 36 and being transversely spaced from each other so as to leave spaces 40 therebetween. The tabs 34 and 38 are coplanar with each other but are in a plane offset from and parallel to respective central mounting portions 42 of the plate portions 26 and 28. The tabs 34 of a first one of the link sections 10 and the tabs 38 of an adjacent link section 10 are respectively received in the spaces 40 and 36 in overlapping relationship to each other, as viewed from the side with the flexors 16 unflexed as appears in the right-hand portion of FIG. 2.

The grouser 14 is in the form of a plate having a central planar mounting portion 44 located opposite to the mounting portions 26 and 28 of the link 12. A grouser bar 46 forms a leading end of the grouser and is joined to the portion 42 by an offset section having a curved surface 48 diverging from and facing the tabs 38 of the link 12. The trailing end of the grouser 14 is defined by an offset section 50 having a surface 52 diverging from and facing the tabs 34 of the link 12.

Figure 2:
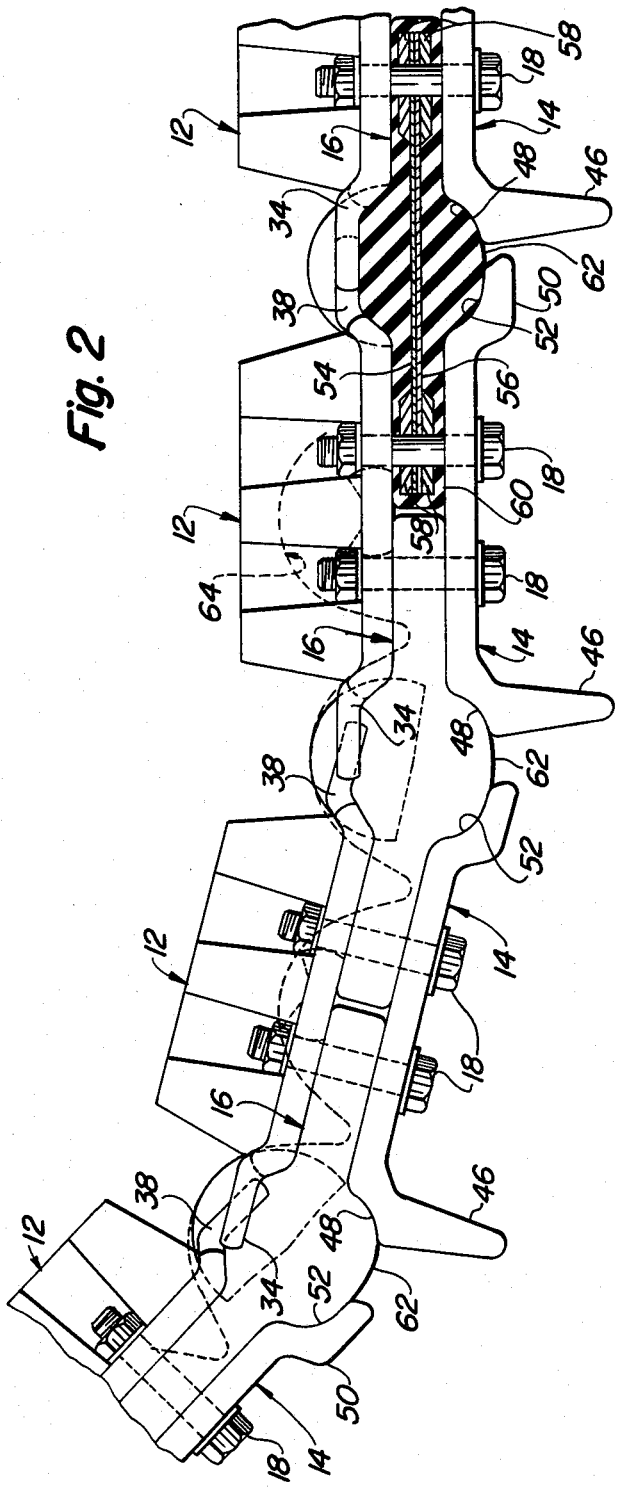
FIG. 2 is a side elevational view of a short portion of an endless track embodying link sections like that of FIG. 1 shown meshed with a sprocket and with one flexor being shown in section so as to expose the tensile load carrying core thereof.

The flexor 16 includes, as viewed in FIG. 2, a tensile load-carrying core comprising upper and lower superposed rectangular plates 54 and 56, respectively, with each plate having its opposite ends reinforced, as at 58, in areas containing the mounting holes 20. The plates 54 and 56 are encapsulated in an elastomeric casing 60 having flat leading and trailing end portions joined by a central enlarged portion 62. When the pair of flexors 16 of one link section 10 are joined to an adjacent link section 10 so as to interconnect the two sections, as shown in FIG. 2, the central enlarged portion 62 fills the space defined by the overlapping tabs 34 and 38 and the grouser surfaces 48 and 52. The enlarged portion 62 of a given flexor may be under a slight amount of compression when in a straight condition as shown at the right-hand portion of FIG. 2 so that debris is precluded from entering between the surface of the portion 62 and the link end tabs or grouser end surfaces.

In operation, as the endless track passes around a drive sprocket 64 (FIG. 2), the flexors 16 of each link section 10 will flex so as to result in the tabs 34 and 38 of adjacent link sections acting against one side of the enlarged portion 62 of the casing 60 of each flexor so as to bend the flexor plates 54 and 56 about a controlled, smooth radius. It will be appreciated that the shapes of the tabs 34 and 38 and the grouser surfaces 48 and 52 and the enlarged portion 62 of the elastomer casing may be altered to achieve a spectrum of bending geometries in the flexor plates. Also, it will be appreciated that during flexure the enlarged portions 62 of the flexors will be extruded into the enlarged space which occurs between ends of the adjacent grouser ends so as to prevent intrusion of dirt, sand and other material which might later cause sharper than desired bending in the plates 54 and 56.

It is to be noted that while the track link section disclosed herein is designed to be driven by a drive sprocket having a single set of teeth, the invention herein is also applicable to track link sections which embody a single flexor and have sprocket-engaging link portions located at opposite sides of the link for engagement with double transversely aligned sets of sprocket teeth.

We claim:

1. In an endless track including a plurality of identical track link sections interconnected to each other, each track link section including at least one flexor, which is substantially rectangular in plan view, and includes a tensile load carrying core encapsulated in an elastomeric casing having flat, opposite end portions respectively sandwiched between respective parallel planar portions of a link and grouser of a first track link section, and between respective parallel planar portions of a link and grouser of an adjacent track link section, the improvement comprising: said casing including an enlarged portion located centrally between said flat opposite end portions; and said links respectively of the first and adjacent track link sections having adjacent ends formed by first and second sets of transversely spaced tabs arranged in overlapping relationship to each other and shaped complementary to and substantially encapsulating one side of the enlarged portion of the casing; and said grousers respectively of the first and adjacent track link sections having adjacent ends terminating close to each other and provided with respective surfaces shaped complementary to and cooperating to substantially encapsulate a second side of the enlarged portion of the casing opposite from the one side.

* * * * *